United States Patent
Healy

(10) Patent No.: US 11,377,202 B2
(45) Date of Patent: Jul. 5, 2022

(54) ACTUATOR FOR AN AIRCRAFT COMPONENT

(71) Applicant: AIRBUS OPERATIONS LIMITED, Bristol (GB)

(72) Inventor: Daren Healy, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 167 days.

(21) Appl. No.: 16/571,747

(22) Filed: Sep. 16, 2019

(65) Prior Publication Data

US 2020/0086977 A1    Mar. 19, 2020

(30) Foreign Application Priority Data

Sep. 17, 2018    (GB) ..................... 1815118

(51) Int. Cl.
*B64C 13/50*    (2006.01)
*B64C 9/16*    (2006.01)

(52) U.S. Cl.
CPC .............. *B64C 13/504* (2018.01); *B64C 9/16* (2013.01)

(58) Field of Classification Search
CPC ..... B64C 13/504; B64C 13/505; B64C 13/50; B64C 13/40; B64C 9/16; B64C 9/323; B64C 9/22; B64C 9/146
See application file for complete search history.

(56) References Cited

U.S. PATENT DOCUMENTS

| | | | |
|---|---|---|---|
| 3,272,090 A * | 9/1966 | Stafford | ................ B64C 13/505 92/140 |
| 4,181,275 A | 1/1980 | Moelter et al. | |
| 4,395,007 A | 7/1983 | Owl, Jr. | |
| 4,765,568 A | 8/1988 | Carl et al. | |
| 6,796,120 B2 | 9/2004 | Franchet et al. | |
| 7,600,715 B2 | 10/2009 | Matsui | |
| 2002/0121086 A1 | 9/2002 | Flavell | |
| 2004/0245386 A1* | 12/2004 | Huynh | ............... B64D 45/0005 244/99.5 |
| 2017/0057620 A1* | 3/2017 | Kossentini | ............ B64C 13/504 |

FOREIGN PATENT DOCUMENTS

| | | |
|---|---|---|
| CN | 108528675 | 9/2018 |
| EP | 0864491 | 9/1998 |
| EP | 2 690 007 | 1/2014 |

OTHER PUBLICATIONS

Extended European Search Report for European Application No. EP19020533.6, nine pages, dated Jan. 30, 2020.
Combined Search and Examination Report for GB Application No. 1815118.3 dated Mar. 18, 2019, 9 pages.

* cited by examiner

*Primary Examiner* — Joshua J Michener
*Assistant Examiner* — Colin Zohoori
(74) *Attorney, Agent, or Firm* — Nixon & Vanderhye P.C.

(57) ABSTRACT

A starboard wing of an aircraft includes various movable aerodynamic surfaces, such as a spoiler, slat, aileron, flap or the like. An actuator is provided for moving each such surface. The location and mounting of the actuator of the starboard wing is symmetrical about the centreline of the aircraft to that of the actuator of the port wing. The location of the piston, arm or other mechanical output of the actuator is at a centre portion of the actuator (i.e. at or near the midline of the actuator. The input port(s) for power is/are also at the centre portion. The actuator for the starboard wing may thus be substantially identical to the actuator for the port wing.

12 Claims, 7 Drawing Sheets

ACTUATOR FOR AN AIRCRAFT COMPONENT

CROSS RELATED APPLICATION

This application claims priority to United Kingdom (GB) Patent Application 1815118.3, filed Sep. 17, 2018, the entire contents of which are hereby incorporated by reference.

BACKGROUND OF THE INVENTION

The present disclosure relates to an actuator for use in an aircraft. More particularly, but not exclusively, this invention concerns an aircraft, an actuator for use in relation to an aircraft component, such as a movable aerodynamic surface, and an actuator for use in relation to a corresponding component on the starboard-side of the aircraft. The invention also concerns a method of designing and manufacturing port and starboard aircraft parts, which each accommodate such an actuator.

An aircraft is typically substantially symmetrical about a vertical plane along the centreline of the aircraft. Thus, typically the main wing on the starboard side of the aircraft will be symmetrical to the main wing on the port side of the aircraft. When designing parts of an aircraft for a wing of an aircraft it is typically assumed that the other wing of the aircraft will be symmetrically arranged. Requiring components of one wing to be symmetrical to those in the corresponding other wing, not only in their shape and configuration, but also in their arrangement in relation to other components and structure of the wing can have a significant impact on design and manufacturing efficiency. It may be necessary to design and manufacture certain components in the wing, such as for example actuators for moving flaps, slats, ailerons, spoilers and the like, to have a left-handed version (for one wing) and a right-handed version (for the other wing). Designing and manufacturing both a left-handed actuator and a right-handed actuator for an aircraft significantly increases both manufacturing costs and maintenance costs. A typical solution employed to avoid the need for both a left-handed actuator and a right-handed actuator is to rely on a single design of actuator and simply invert it (turn it upside down) for use in one of the two wings. That is not always practical however; for example, if gravity has an impact on the function of the actuator.

The present invention seeks to mitigate one or more of the above-mentioned problems. Alternatively or additionally, the present invention seeks to provide an improved aircraft wing and/or an improved actuator for use in an aircraft wing.

SUMMARY OF THE INVENTION

The present invention provides, according to a first aspect, an aircraft comprising a first wing on a starboard side and a second wing on a port side. The first wing is substantially symmetrical to the second wing about a centreline of the aircraft (i.e. when viewed from above). Each wing comprises a main body including load-bearing structure. The load-bearing structure may comprise primary structure and/or secondary structure of the aircraft. The load-bearing structure may comprise one or more spars. The load-bearing structure may comprise one or more ribs. Each wing also comprises a movable aerodynamic surface, such a spoiler for example. The movable aerodynamic surface of the first wing is substantially symmetrical to the movable aerodynamic surface of the second wing about the centreline of the aircraft. There is an actuator for moving the movable aerodynamic surface, the actuator being located in or on the wing. When in situ the actuator may be considered as having an outboard end, an inboard end, and a centre portion, which is located between the outboard end and the inboard end. The actuator is attached to the load-bearing structure of the main body of the wing, for example by a mounting bracket. The actuator has a mechanical output, for example being a piston, arm or the like, arranged to move the movable aerodynamic surface relative to the main body of the wing. The actuator also includes a power input for powering movement of the mechanical output. The location of the actuator ("the first actuator") of the first wing is symmetrical about the centreline to the location of the actuator ("the second actuator") of the second wing. The attachment of the first actuator is also preferably symmetrical to that of the second actuator. For example, the location and arrangement of each attachment between the load-bearing structure of the wing and the first actuator is symmetrical, about the centreline, to that of the second actuator. The location of the mechanical output is preferably at the centre portion of the actuator, preferably directly adjacent to or overlying a centreline of the actuator (the centreline being midway between the outboard end and the inboard end of the actuator). The location of the input of power is preferably also at the centre portion of the actuator, preferably directly adjacent to or overlying a centreline of the actuator. The same design of actuator may thus be used as the first actuator and the second actuator (with the actuator being the same way up), despite the first actuator being used in a setting that is a mirror image of the setting in which the second actuator is used. The first actuator may for example be substantially identical to the second actuator. It may be that the aircraft comprises third and fourth, and optionally more, actuators—installed on the aircraft—such further actuators each being identical to the first—and also to the second—actuator.

The first actuator and the second actuator may each include an input for a control signal for controlling movement of the movable aerodynamic surface. In such a case, it is preferred that the location of the input for the control signal is also at the centre portion of the actuator, preferably directly adjacent to or overlying a centreline of the actuator.

The location of the mechanical output, the location of the input of power, and/or the location of the input for a control signal are preferably centrally positioned on the actuator ("at the centre portion") to allow the same design of actuator to be used as both a left hand version and a right hand version. The locations need not however be exactly at the mid-plane of the actuator (i.e. exactly halfway between the outboard end and the inboard end of the actuator). The centre portion may extend from the mid-plane of the actuator between the inboard end and the outboard end of the actuator by a distance of no greater than 10% of the length of the actuator as measured in the direction from the inboard end to the outboard end of the actuator. It may therefore, by way of example, be that the centre portion occupies about 20% of the volume of the actuator.

It may be that the power for powering movement of the actuator is provided, at least in part, by hydraulic power. It may be that the power for powering movement of the actuator is provided, at least in part, by electric power. The actuator may be an electrically powered hydraulic actuator. The actuator may have inbuilt redundancy, being connected to two separate power sources such that in the event of failure of the first power source a secondary power source provides a back-up. The actuator may be an electrical actuator with hydrostatic transmission (EHA). The actuator may be an electrical actuator with mechanical transmission (EMA). The actuator may be in the form of an electrical backup hydraulic actuator (EHBA). The actuator preferably has jam-tolerant design.

The actuator may be substantially symmetrical about a plane, which is midway between the outboard end of the actuator and the inboard end of the actuator. The actuator may have reflectional symmetrical about its midway plane. It may be the case that the actuator is not symmetrical in its overall shape. The first actuator may be so arranged and configured that it occupies a volume of space (larger than the actuator), which is not occupied by other components or structure of the wing. Such a volume of space may be defined, for example during initial design of the actuator, as a "keep out zone". Such a volume of space has an inboard end, and an outboard end, and is preferably symmetrical about a central plane midway between the inboard end and the outboard end. Thus, whilst the actuator need not necessarily be perfectly symmetrical, the keep-out zone associated with the actuator may have reflectional symmetry about its central plane.

As mentioned above, the mechanical output of the actuator may comprise an arm, for example being in the form of or extending from a piston of the actuator. Such an arm may be arranged to push or pull the movable aerodynamic surface, for example in response to a control signal.

The actuator may be a linear actuator. The actuator may be a rotary actuator.

The actuator may comprise a casing. Such a casing may incorporate at least one system port for the input of power. The casing may incorporate a system port for the input of hydraulic power and a different system port for the input of electric power. There may be at least one further system port in the casing for a different input, for example a control input. The casing may also have an aperture through which the mechanical output is provided. The casing of the actuator may have a maximum dimension of between 200 mm and 1,000 mm. The casing of the actuator may occupy a volume of between 5 and 100 litres, for example between 8 and 60 litres.

The actuator may have a mass of between 10 kg and 100 kg. The actuator may be so configured that the maximum force that can be generated by the actuator is at least 500 N and preferably between 10 kN and 100 kN.

It may be that at least 90% by volume of the actuator is provided in one, two or three main parts (and no more), with each part having a casing having a maximum dimension, the sum of those maximum dimensions being between 200 mm and 1,000 mm. The actuator may be provided in one main part having a casing having a maximum dimension of no more than 600 mm.

The first wing and the second wing of the aircraft may be the main wings of the aircraft. Embodiments of the present invention may however have application in relation to other parts of an aircraft. It may be that an actuator of the present invention has application in relation to other parts of the aircraft, for example in the tail-plane, in the landing gear or in any other part of the aircraft on the port side of the aircraft that has a corresponding mirror image of that part on the starboard side of the aircraft. For example, the first wing and the second wing of the aircraft may alternatively be the starboard side horizontal stabiliser of a tailplane of an aircraft and the portside horizontal stabiliser of the tailplane, respectively.

According to a second aspect of the invention there is provided an aircraft comprising a first movable component (the component for example being an aerodynamic surface such as a spoiler on a wing for example) on a port side of the aircraft, a first actuator for moving the first movable component, a corresponding second movable component on a starboard side of the aircraft, and a second actuator for moving the second component. The first movable component is a mirror image of the second movable component, but (optionally) not symmetrical itself. The mounting arrangement of the first actuator is a mirror image of the mounting arrangement of the second actuator, but each actuator is substantially of the same design. This may be made possible by the actuator having reflectional symmetry. Alternatively, the actuator may not be perfectly symmetrical but instead be so designed that, for those functions which need to be mirrored when the actuator is used on the other side of the aircraft, either (a) there is some form of reflectional symmetry in the way the function is achieved or (b) the function is achieved by means of parts/portions that are positioned sufficiently close to the mid-plane of the actuator. The same actuator may thus be used on either side of the aircraft without any significant compromise (in function, mode of operation, or manner of installation) being needed on one side as compared to the other.

The present invention also provides an actuator for use in the first and/or second aspects of the invention. The present invention also provides a wing, when separate from the rest of the aircraft, which is in the form of one of the wings of the aircraft according to the first and/or second aspects of the invention.

A third aspect of the invention provides a method of designing port and starboard parts of an aircraft (for example the wings) and an actuator for moving a component of the part, there being an actuator associated with the port part and an actuator associated with the starboard part. For example, each wing of the aircraft may comprise one or more movable surfaces and one or more actuators for moving the movable surfaces. The method comprises a step of designing the first part (e.g. the first wing) including designing the shape and composition of structures for handling loads. The method comprises setting the location of the actuator, designing the way in which the actuator is mounted in relation to load bearing structure (possibly including designing the shape and load-handling capacity of such load bearing structure), designing how the actuator is connected to the component to be moved by the actuator, and—preferably—also designing the actuator itself (or at least its general form and function). The method is preferably so performed that each of (a) the location of the actuator, (b) the mounting of the actuator in relation to the load handling structures, and (c) the connection of the actuator to the component to be moved, in one of the port and starboard parts of the aircraft is a mirror image of the corresponding features in the other of the port and starboard parts. In this way, the same design of actuator can be used for the actuator in the port part as is used in the starboard part. It may also be possibly for the same design (the same shape and configuration, for example external shape and manner of actuation) of actuator may be used in more than two locations on the same aircraft, possibly more than two locations on one side (either the port side or the starboard side) of the aircraft. There may, once the design steps have been completed, be a step of manufacturing the port part and/or the starboard part of the aircraft. There may, alternatively or additionally, be a step of manufacturing one or more actuators as so designed. There may be a step of assembling an actuator in or with the part of the aircraft. It will be appreciated that the manufacture of the aircraft part, the manufacture of the actuator, and the assembly of the part and actuator do not need to be performed by the same entity or in the same country.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Embodiments of the present invention concern the configuration and arrangement of an actuator for moving a movable surface on a wing of an aircraft, or a movable surface on another part of the aircraft where a symmetrical movable surface (e.g. mirror image) is provided at a different location on the aircraft. Moveable surfaces on the wing require an actuator to move the surface into the desired position.

Figure 1:
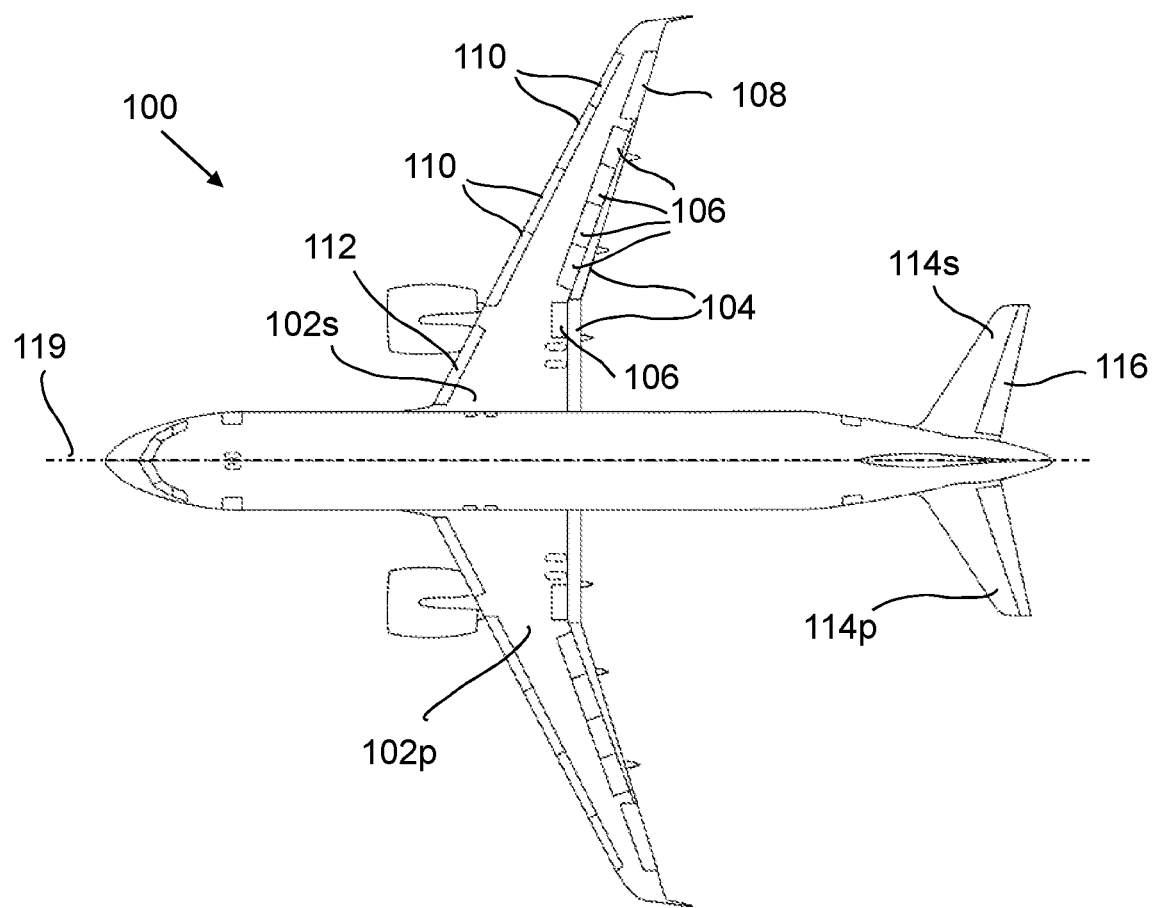
FIG. 1 shows an aircraft in plan view of a type suitable for use with embodiments of the present invention.

FIG. 1 shows an aircraft 100 of a type suitable for use with embodiments of the present invention. The aircraft has a first wing 102s on the starboard side of the aircraft (the right-hand wing when viewing the aircraft from above in the forward direction) and a second wing 102p on the port side of the aircraft (the left-hand wing when viewing the aircraft from above in the forward direction). The first wing 102s is generally symmetrical to the second wing 102p about a vertical plane 119 containing the longitudinal axis of the aircraft. Each wing has various movable aerodynamic surfaces. The first wing 102s has one or more flaps 104, one or more spoilers 106 and one or more ailerons 108 on the trailing edge of the wing and one or more slats 110 and a droop leading edge device 112 on the leading edge of the wing. The second wing 102p has a symmetrical arrangement of movable aerodynamic surfaces. The tail assembly of the aircraft also has two symmetrical wing-like structures in the form of the port and starboard horizontal stabilisers 114p, 114s. The starboard-side stabiliser 114s has at least one elevator 116. The port side stabiliser 114p also has a corresponding symmetrical arrangement of elevators.

Any of the movable aerodynamic services of the aircraft of FIG. 1 may be associated with an actuator for moving the surface in a controlled manner during operation of the aircraft. A schematic representation of such an actuator, of the prior art, is shown in FIG. 2.

Figure 2:
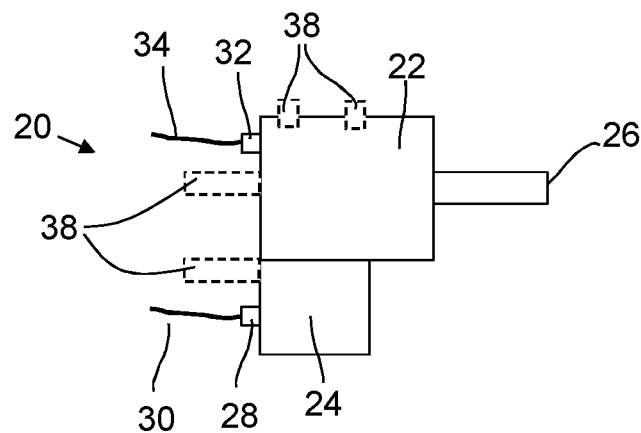
FIG. 2 shows an actuator of the prior art.

FIG. 2 shows an actuator 20 of the prior art suitable for actuating a flap of an aircraft wing. The actuator 20 comprises a casing having a main portion 22 in which various hydraulic components are housed and a secondary portion 24 in which various electric components are housed. The actuator in this example is in the form of a linear actuator including an arm 26, which is arranged in use to move a flap of the wing of the aircraft, via a linkage arrangement not shown. FIG. 2 shows with broken lines the possible positions of fixings 38 that could be used to mount the actuator in an aircraft.

Figure 3:
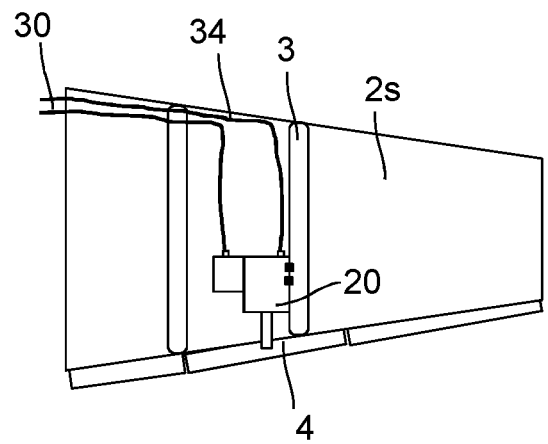
FIGS. 3, 3a, 4 and 5 illustrate actuators of the prior art in a wing of an aircraft.

FIG. 3 shows an example of the prior art actuator 20 of FIG. 2 in situ in a starboard wing 2s of an aircraft (only part of the wing being shown in FIG. 3). The wing 2 includes several ribs 3, a spar 5 and the trailing edge of the wing includes movable flaps 4, which are moved by actuation of the arm 26 of the actuator 20. The actuator 20 is mounted relative to the spar 5 in the wing via fixing lugs 38. The casing also has a first system port 28 for connection to an electric cable 30 and a second system port 32 for connection to a hydraulic supply via hose 34.

Figure 3A:
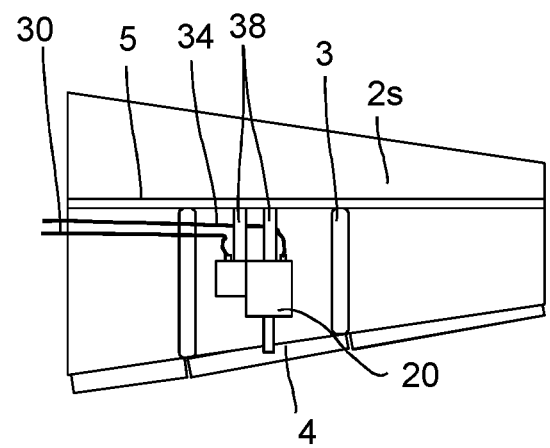

FIG. 3a shows a further example of the prior art actuator 20 of FIG. 2 in situ in a starboard wing 2s of an aircraft (only part of the wing being shown in FIG. 3a). The wing 2 includes several ribs 3 and the trailing edge of the wing includes movable flaps 4, which are moved by actuation of the arm 26 of the actuator 20. The actuator 20 is mounted relative to one of the ribs 3 in the wing via fixing lugs 38. The casing also has a first system port 28 for connection to an electric cable 30 and a second system port 32 for connection to a hydraulic supply via hose 34.

Figure 4:
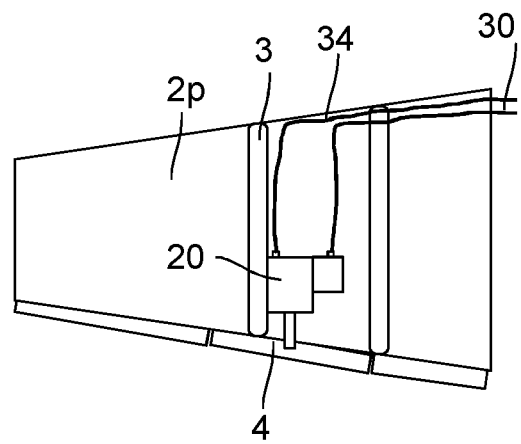
Figure 5:
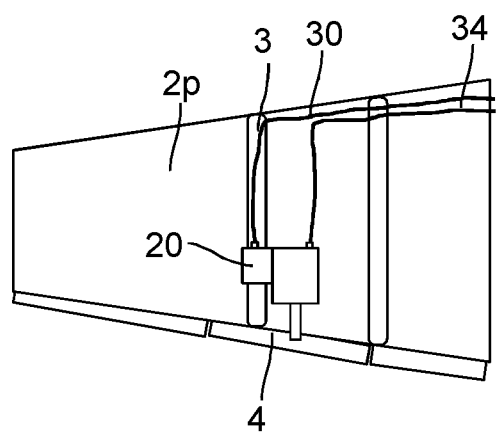

FIG. 4 shows the prior art actuator 20 mounted in a port wing 2p of the aircraft. The same actuator 20 is used as shown in FIG. 3a but in an inverted configuration. It is not always practical to do that however. FIG. 5 shows the problems that can arise if attempts are made to use the same actuator (as used in the starboard wing of FIG. 3a) the same way up in the port wing 2p. If the arm 26 of the actuator is to be mounted to act on the flap 4 at the same location, then the centre of the actuator in the port wing needs to be further outboard than the centre of the actuator in the starboard wing. If the locations and configurations of the ribs of the port wing are to correspond to those of the starboard wing, then the different location of the actuator will require a different mounting arrangement. It will also be seen that the hydraulic supply 34 is shifted slightly inboard and that the electric supply 30 is shifted slightly outboard, requiring different routes for those supplies in each wing. A solution to such issues is to require a left-handed version of the actuator and a right-handed version of the actuator, with the consequent extra cost that such a solution involves.

Figure 6:
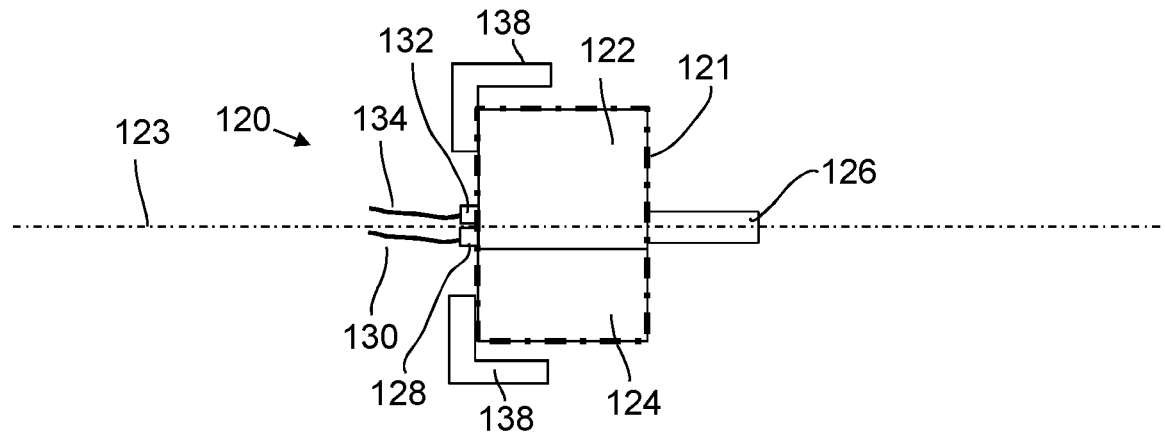
FIG. 6 shows an actuator according to a first embodiment of the invention.
Figure 7:
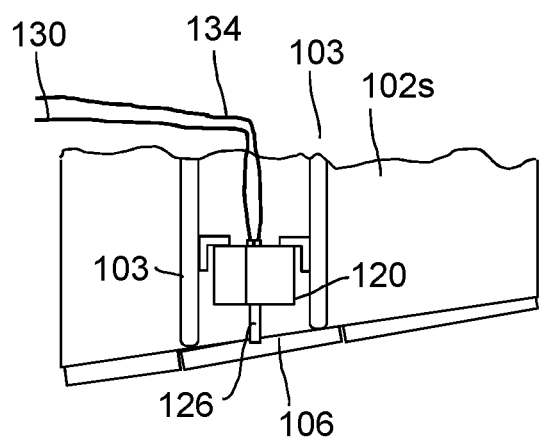
FIG. 7 shows the actuator of the first embodiment in a starboard wing.

FIGS. 6 and 7 show an actuator 120 of a first embodiment of the invention for actuating a spoiler 106 of an aircraft wing (the wing and spoiler being shown schematically in the Figures and no adjacent flaps or the like being shown). The actuator 120 comprises a casing 121 (shown in broken line in FIG. 6). The casing 121 is substantially symmetrical about a plane, which contains the centre line 123 shown in FIG. 6. The actuator 120 has a main portion 122 in which various hydraulic components are housed and a secondary portion 124 in which various electric components are housed. The actuator in this example is in the form of a linear actuator including an arm 126, which is arranged in use to move a spoiler 106 of the wing. The arm 126 is mounted centrally on the body of the actuator and in the region of the centreline 123. The casing 121 includes integrated mounting brackets 138, mounted either side of the actuator about the centreline 123. The hydraulic and electric ports 128 and 132 are mounted in the region of the centreline 123, in this example to either side of the centreline. Control of the actuator can be provided by a separate control cable (not shown) or possibly by wireless control signals.

FIG. 7 shows the actuator 120 of the first embodiment in situ in a starboard wing 102s of an aircraft (only part of the wing being shown in FIG. 7). The wing 102 includes several ribs, two of which (ribs 103) are shown in FIG. 7. The trailing edge of the wing includes a movable spoiler 106, which is moved by via a linkage arrangement (not shown) which is powered by actuation of the arm 126 of the actuator 120. The actuator 120 is mounted midway between the two ribs 103 shown in FIG. 7 via its mounting brackets 138. The mounting of the actuator could be to other load-bearing structure in the wing. Such a load-bearing structure may comprise primary structure and/or secondary structure of the aircraft. Primary structure may be considered as being critical structure for carrying flight, ground or pressurisation loads being sufficiently critical to safe operation of the aircraft such that failure of the structure would result in failure of the aircraft, or otherwise reduce the structural integrity of the aircraft to an unsafe level. Secondary structure may be considered as less critical than primary structure, but nevertheless having as a purpose the carrying or sustaining of loads generated during operation of the aircraft.

Figure 8:
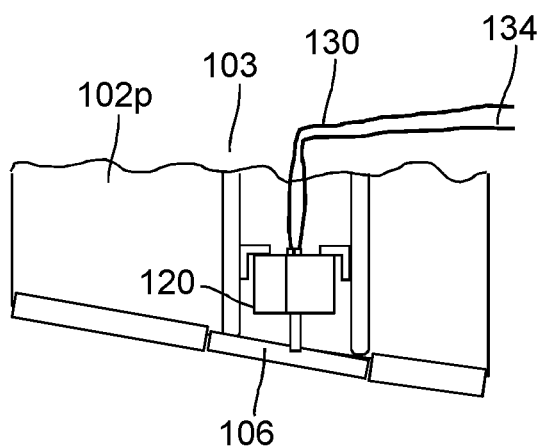
FIG. 8 shows the actuator of the first embodiment in a port wing.

The system port 128 is connected to an electric cable 130 and the system port 132 is connected to a hydraulic supply via hose 134. FIG. 8 shows the same actuator 120 mounted in the port wing 102p of the aircraft. The same actuator 120 is used in the same configuration (and the same way up). As a result of the central location of the actuator arm 126, and of the central location of the actuator between the two ribs 103 in the starboard wing 102s, it is possible to mount an identical actuator in the port wing 102p. Also, as a result of the central location of the hydraulic/electric ports 128, 132, the length of the connecting conduits 130, 134 may be substantially the same in the starboard wing as in the port wing. Routing of cables/hoses can therefore be substantially the same in each wing. By designing the actuator and the local wing structure to be symmetrical at a local level, it is possible to have one actuator design that is suitable for use in both the port wing and the starboard wing. Manufacturing time and costs may therefore be reduced. The number of spare parts that need to be made available may also be reduced and maintenance activities and storage space for parts made more efficient.

It will be seen that there is a 3-D volume that envelopes the actuator and no other structure in the wing (i.e. a keep-out zone) which itself has reflectional symmetry. In this embodiment, the actuator itself has an overall shape that broadly has reflectional symmetry, albeit not perfect symmetry. The mass of the actuator is about 10 kg and the maximum force that can be generated by the actuator is about 10 kN.

To summarise the first embodiment, a starboard wing of an aircraft comprises various movable aerodynamic surfaces, such as a flap, slat, aileron, spoiler or the like. An actuator is provided for moving each such surface. The location and mounting of the actuator of the starboard wing is symmetrical about the centreline of the aircraft to that of the actuator of the port wing. The location of the piston, arm or other mechanical output of the actuator is at a centre portion of the actuator. The input port for power is also at the centre portion. The actuator for the starboard wing may thus be substantially identical to the actuator for the port wing. It will be understood that the symmetry of the location and mounting of the actuator, of the mechanical output and of the system ports/connections to/from the actuator need not be perfect, but sufficiently close to symmetrical that the actuator for the starboard wing may be substantially identical to the actuator for the port wing without any significant compromise (in function, mode of operation, or manner of installation) being needed on one side as compared to the other.

Figure 9:
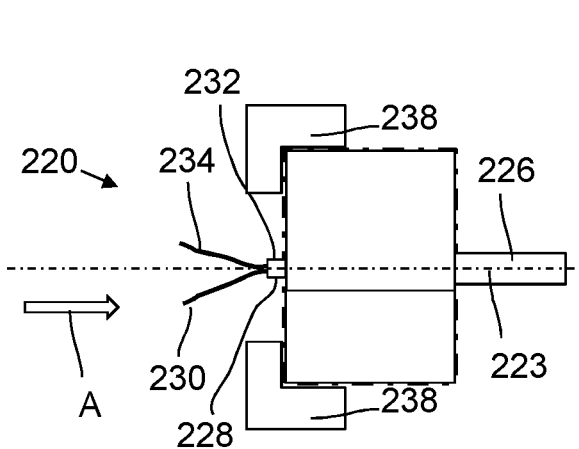
FIGS. 9 and 10 show an actuator according to a second embodiment of the invention.
Figure 10:
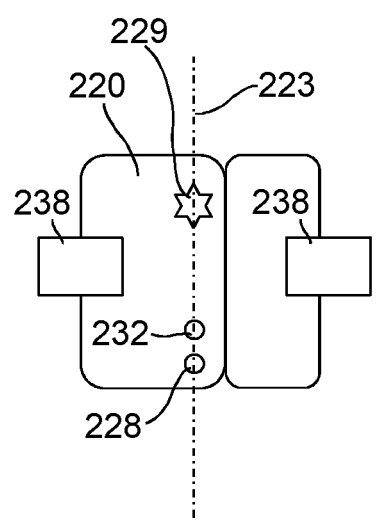
Figure 11:
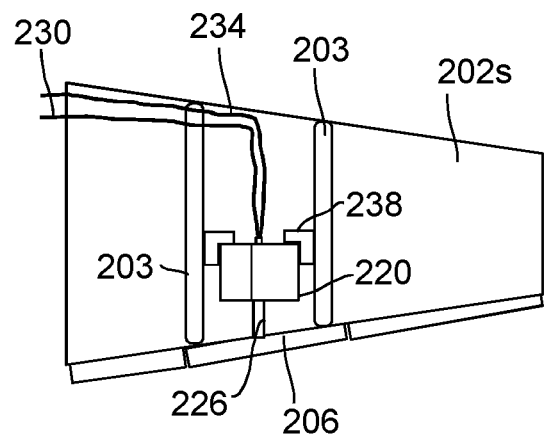
FIG. 11 shows the actuator of the second embodiment in a starboard wing.
Figure 12:
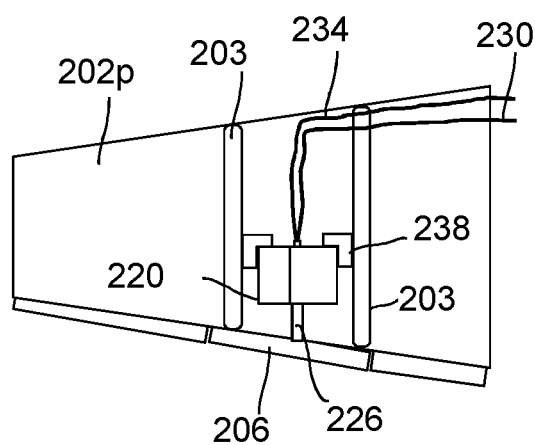
FIG. 12 shows the actuator of the second embodiment in a port wing.

FIG. 9 shows an actuator 220 according to a second embodiment of the invention, relating to a larger aircraft compared to the first embodiment. Similar reference numerals are used for similar parts (but starting with a "2", instead of a "1"). Only those aspects of the actuator 220 that differ from the actuator 120 will now be described. The mounting brackets 238 are bulkier than the corresponding brackets 138 of the first embodiment. The ports for hydraulic and electric connections 228, 232, are positioned one above the other in line with the central plane 223, as shown more clearly in FIG. 10 which is an end on you of the actuator looking in the direction shown by the arrow A of FIG. 9. There is a separately provided system port 229 for the provision of a control signal. That system port 229 is also centrally positioned in relation to the actuator body. It might be that a larger actuator has more than one such control port 229. FIG. 11 shows the arrangement of the actuator 220 in a starboard wing 202s, whereas FIG. 12 shows the same actuator 220 in a port wing 202p. As a result of the central arrangement of the ports 228, 232, the routing of cables/hoses 230, 234 can be symmetrical about the centreline of the aircraft. The actuator 220 has a mass of about 70 kg. The maximum force that can be generated by the actuator is about 70 kN.

Figure 13:
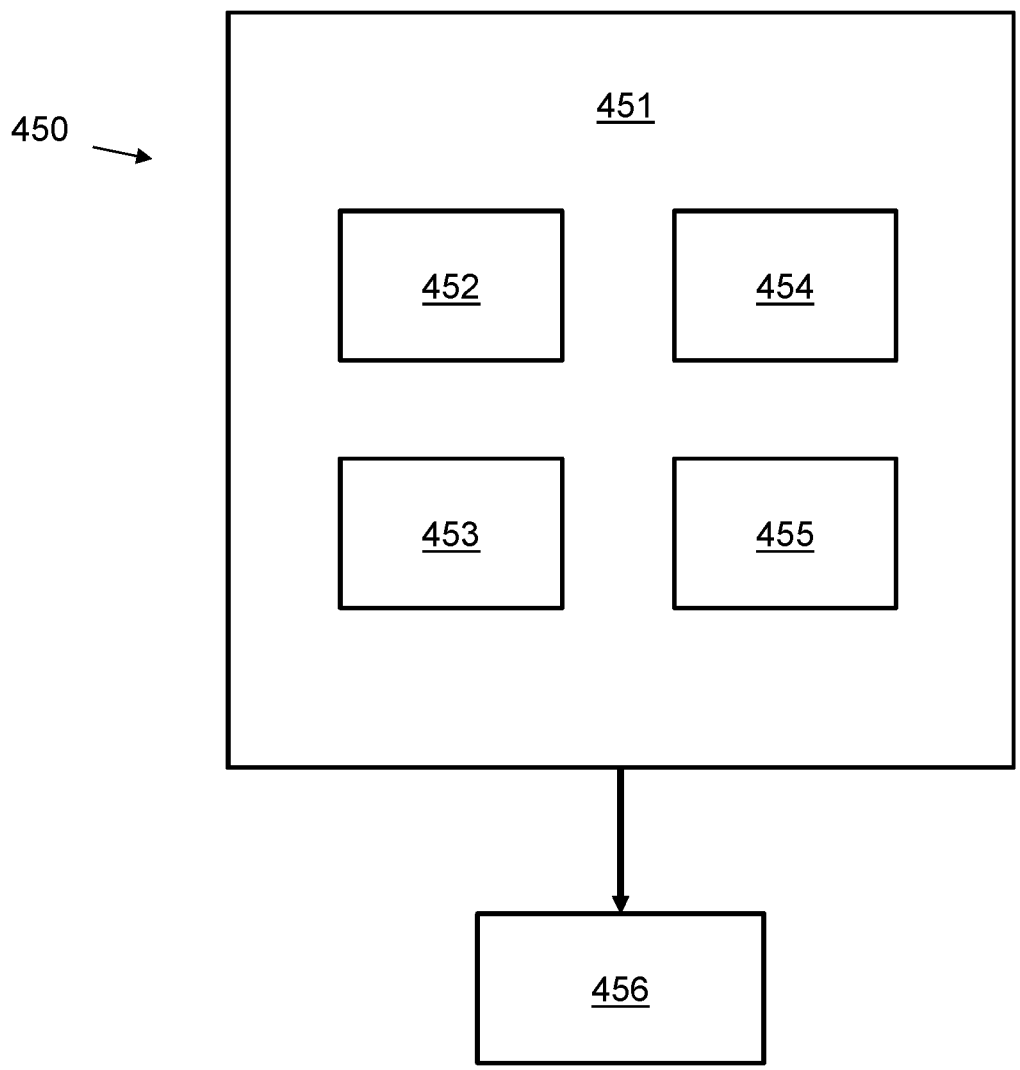
FIG. 13 is a flowchart of a method according to a third embodiment of the invention.

FIG. 13 shows a method 450 of designing and manufacturing port and starboard aircraft wings for an aircraft. Each wing comprises one or more movable surfaces and one or more actuators for moving the movable surfaces. The method comprises a step 451 of designing a first wing including designing the shape and composition of load bearing structures in the wing (both primary structure and secondary structure, for example), and designing the shape, configuration and kinematics of the movable surfaces. All of the following aspects are integrated into this design process:

(a) setting (box 452) the location of an actuator for moving at least one of the movable surfaces, (b) determining (box 453) the configuration and location(s) of the mounting of the actuator in relation to load bearing structure in the wing, (c) determining (box 454) the connection of the actuator to the at least one of the movable surfaces, and (d) designing (box 455) the actuator. The design process 451 is performed in such a way that the port wing may be a mirror image of the starboard wing insofar as each aspect is concerned. A second wing is then designed 456 substantially as a mirror image of the first wing, but using the same design of actuator. The design process 451 is thus also performed in such a way that the same design of actuator can be used for the actuator in the port wing as is used in the starboard wing. The actuator and surrounding structure are designed in each case such that there is a symmetrical keep-out zone for features of the actuator. The keep-out zone for the port side actuator is symmetrical about the centre line of the aircraft to the keep-out zone for the starboard side actuator and each keep-out zone itself has reflectional symmetry. Having a keep-out zone which is symmetrical in this way and designing the shape of the actuator accordingly, allows the keep-out zone to be a smaller volume than might otherwise be the case. The actuator itself need not be perfectly symmetrical, however.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The actuator itself may have perfect reflectional symmetry.

The actuator may be installed to move other components of the aircraft. For example the actuator may be installed in or on a tailplane or the landing gear. The component or surface moved by the actuator may be an aileron, a flap, a slat, a droop leading edge device, a wing tip device, an elevator, or other moving surfaces or parts of the aircraft, not necessarily being in the form of an aerodynamic surface.

The mounting brackets, or the like, for mounting the actuator to the load-bearing structure need not be an integral part of the actuator. There may for example be one or more features such as lugs, eyelets, mounting bosses or the like of the actuator that allow for fixing the aperture with the use of supplementary fixings to similar features of the load bearing structure.

The actuator is shown in at least some of the Figures as being mounted, via mounting means, to one or more ribs. The actuator could be mounted to other load-bearing structure, such as a wing spar for example.

The actuator may not have any hydraulic power supply and/or require the use of hydraulic fluid to operate. The actuator could be a cylindrical and/or a rotary actuator.

It will be appreciated that the term centre line is used herein in relation to something having reflectional symmetry. In such cases there will be a notional plane containing the centre line, there being reflectional symmetry about that notional plane—for example, a notional plane that divides the aircraft into a port-side half and a starboard-side half.

It will also be appreciated that embodiments of the invention may have application on an aircraft with what might normally be described as a single wing. In such cases, the aircraft will typically have a left wing portion and a right wing portion that can be considered as a port-side wing and a starboard-side wing.

The term 'or' shall be interpreted as 'and/or' unless the context requires otherwise.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a first wing on a starboard side and a second wing on a port side, the first wing being substantially symmetrical to the second wing about a centreline of the aircraft, wherein each of the first wing and the second wing comprises a main body including load-bearing structure,
a movable aerodynamic surface,
an actuator which is an EHA or EHBA and attached to at least one part of the load-bearing structure of the main body of the wing, the actuator having an arm arranged to move the movable aerodynamic surface relative to the main body of the wing, and an input of power for powering movement of the mechanical output, and wherein
the movable aerodynamic surface of the first wing is symmetrical to the movable aerodynamic surface of the second wing about the centreline of the aircraft,
the location of the actuator of the first wing is symmetrical about the centreline to the location of the actuator of the second wing,
the location of the part of the load-bearing structure of the main body of the wing to which the actuator of the first wing is attached is symmetrical, about the centreline, to the location of the part of the load-bearing structure of the main body of the wing to which the actuator of the second wing is attached,
each actuator has an outboard end, an inboard end, and a main centerline which is located midway between the outboard end and the inboard end,
the location of the arm is in the region of a main centerline of the actuator,
wherein the power for powering movement of each actuator is provided, at least in part, by hydraulic power and, at least in part, by electric power,
wherein the location of a hydraulic port for the hydraulic power and the location of an electric port for the electric power are in the region of the main centerline of the actuator,
wherein the actuator of the first wing is substantially identical to the actuator of the second wing,
the actuator has a length as measured in the direction from the inboard end to the outboard end of the actuator,
the actuator has a mid-plane at the same position between the inboard end and the outboard end of the actuator as the centerline, and
the locations of the arm, of the hydraulic port, and of the electric port are all within a central region of the actuator, the central region extending from the mid-plane of the actuator by a distance of 10% of the length of the actuator.

2. An aircraft according to claim 1, wherein each actuator includes an input for a control signal for controlling movement of the movable aerodynamic surface, the location of the input for the control signal being in the region of the centreline of the actuator.

3. An aircraft according to claim 1, wherein the actuator of the first wing is disposed within a keep-out zone not occupied by other components or structure of the wing, the keep-out zone having an inboard end, and outboard end, and is symmetrical about a central plane midway between the inboard end and the outboard end of the keep-out zone.

4. An aircraft according to claim 1, wherein the mechanical output of the actuator comprises an arm arranged to push or pull the movable aerodynamic surface.

5. An aircraft according to claim 1, wherein the movable aerodynamic surface is a spoiler.

6. An aircraft according to claim 1, wherein the actuator has a mass of between 10 kg and 50 kg, the maximum force that can be generated by the actuator is between 500 N and 10 kN.

7. An aircraft according to claim 1, wherein hydraulic port and the electric port are located proximate to the main centerline of the actuator.

8. An aircraft according to claim 7, wherein one of the hydraulic port and the electric port is located to one side of the main centerline of the actuator, and the other of the hydraulic port and the electric port is located on the opposite side of the main centerline of the actuator.

9. An aircraft according to claim 1, wherein the actuator of the first wing is substantially identical to, and arranged the same way up as, the actuator of the second wing.

10. A method of designing and manufacturing port and starboard aircraft wings for an aircraft, each wing comprising one or more movable surfaces and one or more actuators for moving the movable surfaces, wherein the method comprises the following steps:
   designing a first wing including designing the shape and composition of structures in the wing for handling loads, and designing the shape, configuration and kinematics of the movable surfaces,
   integrating into the design process all of the following:
   (a) the location of an actuator for moving at least one of the movable surfaces,
   (b) the mounting of that actuator in relation to the structures in the wing for handling loads,
   (c) the connection of the actuator to the at least one of the movable surfaces, and
   (d) the design of the actuator,
   such that each of the location of the actuator, the mounting of the actuator in relation to the structures in the wing for handling loads, and the connection of the actuator to the at least one of the movable surfaces, in one wing is a mirror image of the corresponding features in the other wing
   and
   such that the same design of actuator can be used for the actuator in the port wing as is used in the starboard wing;
   the method then comprising a step of manufacturing one or both of (a) the wings of the aircraft and (b) the actuators for the wings of the aircraft, and
   each actuator has an outboard end, an inboard end, and a main centerline which is located between the outboard end and the inboard end,
   the location of the arm is in the region of a main centerline of the actuator,
   wherein the power for powering movement of each actuator is provided, at least in part, by hydraulic power and, at least in part, by electric power,
   wherein the location of a hydraulic port for the hydraulic power and the location of an electric port for the electric power are in the region of the main centerline of the actuator,
   wherein the actuator of the first wing is substantially identical to the actuator of the second wing,
   the actuator has a length as measured in the direction from the inboard end to the outboard end of the actuator,
   the actuator has a mid-plane at the same position between the inboard end and the outboard end of the actuator as the centerline, and
   the locations of the arm, of the hydraulic port, and of the electric port are all within a central region of the actuator, the central region extending from the mid-plane of the actuator by a distance of 10% of the length of the actuator.

11. An aircraft comprising a first wing on a starboard side and a second wing on a port side, the first wing being substantially symmetrical to the second wing about a centreline of the aircraft, wherein each of the first wing and the second wing comprises
   a main body including load-bearing structure,
   a movable aerodynamic surface,
   an actuator which is an EHA or EHBA and attached to at least one part of the load-bearing structure of the main body of the wing, the actuator having an arm arranged to move the movable aerodynamic surface relative to the main body of the wing, and an input of power for powering movement of the mechanical output, and wherein
   the movable aerodynamic surface of the first wing is symmetrical to the movable aerodynamic surface of the second wing about the centreline of the aircraft,
   the location of the actuator of the first wing is symmetrical about the centreline to the location of the actuator of the second wing,
   the location of the part of the load-bearing structure of the main body of the wing to which the actuator of the first wing is attached is symmetrical, about the centreline, to the location of the part of the load-bearing structure of the main body of the wing to which the actuator of the second wing is attached,
   each actuator has an outboard end, an inboard end, and a casing having a main portion and a secondary portion which is located between the outboard end and the inboard end, the casing is substantially symmetrical about a plane extending through a main centerline of the casing,
   the location of the arm is at the main portion of the actuator and aligned along the main centerline,
   wherein the power for powering movement of each actuator is provided, at least in part, by hydraulic power and, at least in part, by electric power,
   wherein the location of a hydraulic port for the hydraulic power and the location of an electric port for the electric power are symmetrically positioned relative to the main centerline at the main portion of the actuator,
   wherein the actuator of the first wing is substantially identical to the actuator of the second wing,
   the actuator has a length as measured in the direction from the inboard end to the outboard end of the actuator,
   the actuator has a mid-plane at the same position between the inboard end and the outboard end of the actuator as the centerline, and
   the locations of the arm, of the hydraulic port, and of the electric port are all within a central region of the actuator, the central region extending from the mid-plane of the actuator by a distance of 10% of the length of the actuator.

12. An aircraft according to claim 11, wherein the actuator of the first wing is substantially identical to, and arranged the same way up as, the actuator of the second wing.

* * * * *